March 2, 1965 E. NICHOLS 3,171,724

SMOOTHING BLOCK AND METHOD OF MANUFACTURE

Filed March 7, 1962

INVENTOR.
Edgar Nichols
BY
ATTORNEY William S. Dorman

United States Patent Office 3,171,724
Patented Mar. 2, 1965

3,171,724
SMOOTHING BLOCK AND METHOD OF MANUFACTURE
Edgar Nichols, Box 177, Hauula, Hawaii
Filed Mar. 7, 1962, Ser. No. 178,207
3 Claims. (Cl. 51—297)

The present invention relates to a sanding device and, more particularly, to a sanding block, its method of manufacture and the compositions employed therein.

The use of sandpaper is so well known that its mere mention is sufficient to summon to one's mind the details of the same. Also, many abrasive materials which can be used by themselves or in conjunction with, or part of, sandpaper are entirely familiar to those skilled in the art to which the present invention pertains. Furthermore, it is well recognized that these abrasives and/or sandpaper can be applied by hand or with the aid of a machine, either reciprocatory or rotary.

The present invention, on the other hand, represents a distinct improvement over prior art means for effecting sanding and smoothing actions. In one form of the present invention, relatively thin fiber glass sheets are immersed in styrene plastic. The excess plastic is allowed to drip and, then one or both sides of each sheet is covered with as much abrasive grit as will adhere. The sheets are sandwiched between one inch thick slabs of foam glass and the composite structure is clamped until the plastic hardens. The resulting structure is cut into longitudinal strips by means of cuts which are normal to the sheets. The ends of the cut strips are then cut at an angle of thirty degrees with respect to the strips. The last mentioned pieces, which appear in elevation as laminated parallelograms, are then attached to a handle, as desired.

The smoothing block described above forms a new and unique product in that the stiffened fiber glass acts as a cutting plane, the abrasive grit performs a sanding action, and the particles of foam glass perform a polishing action. Thus, the device of the present invention takes the place of coarse, medium and fine sandpaper. There is no need to discard a partly used product and the device retains its efficiency until it is used up entirely.

According to another embodiment of the present invention, the fiber glass sheets are eliminated and replaced by a paste made from eight parts by weight of gypsum plaster (plaster of Paris), three parts Portland cement, two parts brick clay, one part powdered pumice, three parts abrasive grits and sufficient water to make a thick paste. The paste is spread on the blocks of foam glass to form layers of one-eighth of an inch thickness and the blocks are sandwiched together until the paste dries. Only initial pressure is required to expel air. The composite sheets are cut into longitudinal strips and the ends are cut on a sixty degree bias. The top and sides of the angularly cut strips are covered with a plastic foam, such as polyurethane, and the whole is placed in a properly shaped mold where the polyurethane foam is allowed to cure. The outer foam covering forms an attractive and utilitarian handle which assists in binding the entire device together; the handle also protects the edges of the foam glass from chipping. Furthermore, the outer foam covering tends to hold and conserve the abrasive grit which may become loosened as the product wears.

In order to make the paste referred to above, the dry ingredients are mixed together thoroughly and then water is added slowly until a thick paste is formed. The paste is placed upon the blocks of foam glass, spread with a trowel and levelled off with a straight edge to one-eighth of an inch thickness. The layers are sandwiched together as described above.

Therefore it is a principal object of the present invention to provide a sanding device of the type described above comprising alternate layers of foam glass and layers containing abrasive grit, the layers being bonded together to form a unitary structure. The structure is so cut that the various sheets at the end of the sanding block will be disposed at an angle to the working surface.

It is a further object of the present invention to provide a sanding device of the type described above comprising alternate layers of fiber glass and foam glass with styrene plastic and abrasive grit constituting the interfaces between the layers of fiber glass and foam glass. The structure is so cut that the various sheets at the end of the sanding block will be disposed at an angle of thirty degrees to the working surface.

It is a further object of the present invention to provide a device of the character described above wherein the layers between the sheets of foam glass are comprised of a paste made from a mixture of about eight parts by weight of gypsum plaster (plaster of Paris), three parts Portland cement, two parts brick clay, one part powdered pumice, three parts abrasive grits and sufficient water to make the paste of a thick consistency. The paste is spread in layers of one-eighth of an inch thickness on the foam glass and the layers are sandwiched together until the paste dries; the resulting structure is cut so that the sheets of foam glass at the working end of the device are disposed at an angle of sixty degrees with respect to the working surface; the device is also covered with polyurethane foam which forms an attractive and utilitarian handle and which helps to protect and conserve the product.

It is a further object of the present invention to provide a device of the character described above which is capable of planing, sanding and polishing.

It is a further object of the present invention to provide a method of manufacturing the smoothing block referred to above.

It is a further object of the present invention to provide a novel composition employed in the smoothing block described above.

Other and further objects and advantageous features of the present invention will hereinafter more fully appear in connection with a detailed description of the drawings in which.

Figure 1:
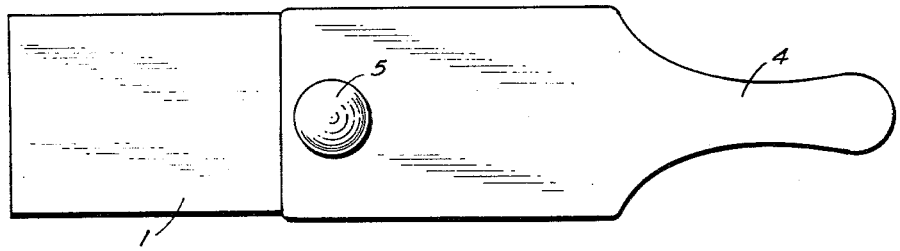
FIGURE 1 is a plan view of a smoothing block made in accordance with one embodiment of the present invention.
Figure 2:
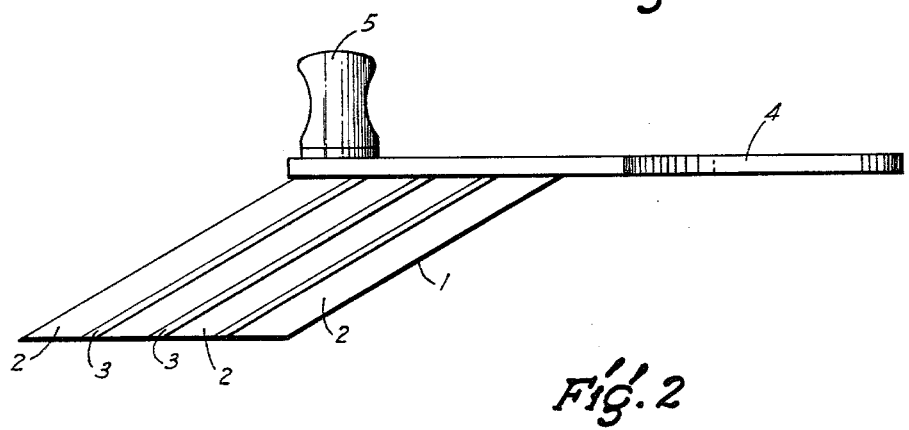
FIGURE 2 is an elevation of the smoothing block shown in FIGURE 1.

Referring to the drawings in detail, FIGURE 2 shows a smoothing block 1 formed from a plurality of layers 2 of foam glass interleaved with a plurality of sheets 3 of fiber glass. The fiber glass sheets and the foam glass slabs are bonded together in the following manner: the fiber glass layers 3 are immersed in styrene plastic. After the excess is allowed to drip from the sheets, one side (at least) is covered with as much abrasive grit as will adhere. The fiber glass sheets are then placed alternately between the slabs of foam glass and the entire structure is clamped until the plastic hardens. A hardening agent such as methyl ethyl ketone may be mixed with the styrene plastic to facilitate the hardening operation. The composite structure is then cut into longitudinal strips of proper width and these cut strips are then cut adjacent the ends at an angle of thirty degrees with respect to the sheets so as to produce the smoothing block 1 as shown in FIGURE 2. For the sake of convenience, the smoothing block may be attached to a handle 4 and, if further desired, a knob 5 may be attached to the handle.

Figure 3:
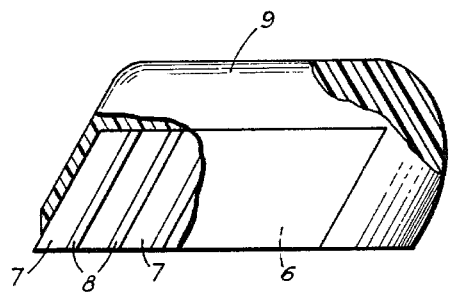
FIGURE 3 is a fragmentary elevation of another embodiment of the present invention with portions of the outer covering being broken away to show the internal structure of the device.

In the embodiment shown in FIGURE 3, there is shown a smoothing block 6 made from alternate layers 7 of foam glass. The intermediate layers 8, however, are not made from fiber glass sheets as described above, but are made in the following manner: a paste is made from eight parts by weight of gypsum plaster, three parts Portland cement, two parts brick clay, one part powdered pumice, three parts abrasive grit and sufficient water to obtain a paste of a thick consistency. This mixture is sandwiched between the layers 7 of foam glass until the mixture hardens to form the intermediate layers 8. The resulting structure is cut into longitudinal strips and then the strips are cut on a sixty degree bias to form small blocks such as the smoothing block 6. The top and sides of the block are covered with a handle 9 which is made from a plastic foam, such as polyurethane foam, the latter being formed into a properly shaped mold. The outer foam forms an attractive and utilitarian handle, it assists in holding together the intermediate layers 7 and 8, it protects the edge of the foam glass from chipping and tends to hold and conserve the abrasive grit which becomes loosened as the block wears.

The layers 8 shown in FIGURE 3 are formed in the following manner: eight parts by weight of gypsum plaster, three parts Portland cement, two parts brick clay, one part powdered pumice and three parts abrasive grits are mixed together thoroughly and then water is added slowly until a thick paste is formed. The paste is placed upon the blocks 7 of foam glass, spread with a trowel and levelled off with a straight edge to one-eighth of an inch thickness. All of the layers are sandwiched together and the paste is allowed to harden so as to form the intermediate layers 8 which are, as a result, thoroughly bonded to the layers 7. The resulting structure is cut into longitudinal strips and, later on, the edges at a sixty degree bias to produce smoothing blocks such as the block 6 shown in FIGURE 3.

The smoothing blocks described above have a number of advantages which cannot be found in sandpaper or abrasive grit alone; for example, the stiffened fiber glass acts in the manner of a cutting plane; the abrasive grit which is embedded in the plastic has an abrasive or sanding action; and the foam glass performs a polishing action as the working surface wears down. Thus, a single device can take the place of coarse, medium and fine sandpaper.

Whereas, the present invention has been described in particular relation to the drawings attached hereto, it should be understood that other and further modifications, apart from those shown or suggested herein, may be made within the spirit and scope of this invention.

What is claimed is:

1. An abrasive material, consisting essentially of a hardened paste made from a mixture of eight parts by weight of gypsum plaster, three parts by weight Portland cement, two parts by weight brick clay, one part by weight powdered pumice, three parts by weight abrasive grit, and sufficient water to obtain a paste.

2. A smoothing device comprising a plurality of alternate layers of foam glass and layers containing abrasive grit, the resulting structure being cut on an angle with respect to the layers, said layers containing abrasive grit being formed from a hardened paste consisting essentially of about eight parts by weight of gypsum plaster, three parts by weight of Portland cement, two parts by weight of brick clay, one part by weight of powdered pumice, three parts by weight of abrasive grit and water.

3. A method of making a smoothing device which comprises forming a series of alternate layers of foam glass and intermediate layers containing abrasive grit, said intermediate layers being made from a thickened paste consisting essentially of eight parts by weight of gypsum plaster, three parts by weight of Portland cement, two parts by weight of brick clay, one part by weight of powdered pumice, three parts by weight of abrasive grit, and sufficient water to obtain said paste, cutting the composite structure into longitudinal strips after said paste is hardened, and cutting such strips on the bias such that the layers form an angle with respect to a working surface.

References Cited by the Examiner
UNITED STATES PATENTS

| | | | |
|---|---|---|---|
| 1,963,154 | 6/34 | Schneider | 51—307 |
| 1,966,101 | 7/34 | Miller | 51—297 |
| 2,232,389 | 2/41 | Jurkat | 51—297 |
| 2,906,612 | 9/59 | Anthony | 51—293 |

ALEXANDER H. BRODMERKEL, *Primary Examiner.*

MORRIS LIEBMAN, *Examiner.*